US008563636B2

(12) United States Patent
Wada et al.

(10) Patent No.: US 8,563,636 B2
(45) Date of Patent: Oct. 22, 2013

(54) AQUEOUS TWO-PACKAGE TYPE CLEAR COATING COMPOSITION AND PROCESS FOR THE FORMATION OF MULTILAYER FINISH COATING FILM

(75) Inventors: Seiji Wada, Hiratsuka (JP); Yuta Baba, Hiratsuka (JP); Koki Chiga, Hiratsuka (JP); Takashi Noguchi, Hiratsuka (JP); Takato Adachi, Hiratsuka (JP); Hiroyuki Onoyama, Hiratsuka (JP); Hideo Sugai, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 258 days.

(21) Appl. No.: 12/312,039

(22) PCT Filed: Oct. 23, 2007

(86) PCT No.: PCT/JP2007/070630
§ 371 (c)(1),
(2), (4) Date: Apr. 23, 2009

(87) PCT Pub. No.: WO2008/050756
PCT Pub. Date: May 2, 2008

(65) Prior Publication Data
US 2009/0274846 A1    Nov. 5, 2009

(30) Foreign Application Priority Data
Oct. 23, 2006    (JP) .................................. 2006-287696

(51) Int. Cl.
| | | |
|---|---|---|
| *B05D 3/02* | (2006.01) |
| *C08K 5/04* | (2006.01) |
| *C08K 5/13* | (2006.01) |
| *C08K 5/3432* | (2006.01) |
| *C08K 5/3435* | (2006.01) |
| *C08K 5/42* | (2006.01) |
| *C08K 5/521* | (2006.01) |
| *C08L 33/02* | (2006.01) |
| *C08L 33/14* | (2006.01) |

(52) U.S. Cl.
USPC ............ 524/127; 427/385.5; 427/388.4; 524/99; 524/100; 524/156; 524/157; 524/283; 524/558; 525/123; 525/127; 525/128

(58) Field of Classification Search
None
See application file for complete search history.

(56) References Cited

U.S. PATENT DOCUMENTS

| | | | |
|---|---|---|---|
| 5,670,600 A | 9/1997 | Nienhaus et al. |
| 5,993,911 A | 11/1999 | Brenke et al. |
| 6,376,602 B1 * | 4/2002 | Probst et al. ................. 524/591 |
| 2001/0021746 A1 | 9/2001 | Nabavi et al. |
| 2002/0143101 A1 | 10/2002 | Probst et al. |
| 2003/0158328 A1 | 8/2003 | Nabavi et al. |
| 2005/0033008 A1 * | 2/2005 | Adams et al. .................. 528/44 |
| 2005/0165159 A1 | 7/2005 | Ogura et al. |

FOREIGN PATENT DOCUMENTS

| | | |
|---|---|---|
| JP | 7-113005 | 5/1995 |
| JP | 8-512338 | 12/1996 |
| JP | 11-510210 | 9/1999 |
| JP | 2000-506195 | 5/2000 |
| JP | 2002-146268 | 5/2002 |
| JP | 2003-533566 | 11/2003 |
| JP | 2004-256802 | 9/2004 |
| JP | 2004-314060 | 11/2004 |
| JP | 2005-200497 | 7/2005 |
| JP | 2005-200644 | 7/2005 |
| JP | 2007-84801 | 4/2007 |
| JP | 2007-84801 A * | 4/2007 |

OTHER PUBLICATIONS

United Kingdom Examination Report issued Aug. 15, 2011 in corresponding United Kingdom Patent Application No. 0906141.7.

* cited by examiner

*Primary Examiner* — Robert Sellers
(74) *Attorney, Agent, or Firm* — Wenderoth, Lind & Ponack, L.L.P.

(57) ABSTRACT

The present invention provides an aqueous two-package type clear coating composition comprising: (A) an aqueous dispersion of a hydroxyl group- and acid group-containing acrylic resin having a hydroxyl value of 30 to 200 mg KOH/g, an acid value of 5 to 50 mg KOH/g, a weight average molecular weight of 3,000 to 30,000, and a glass transition temperature of −30 to +40° C. obtained by radical polymerization of 10 to 50 mass % of a secondary hydroxyl group-containing monomer (a) and 50 to 90 mass % of at least one other unsaturated monomer (b); and (B) a polyisocyanate curing agent obtained by mixing (c) a polyisocyanate compound and (d) a compound containing an anionic functional group, a polyoxyethylene group, and a hydrocarbon group, and a process for forming a multilayer topcoat film using the same.

14 Claims, No Drawings

AQUEOUS TWO-PACKAGE TYPE CLEAR COATING COMPOSITION AND PROCESS FOR THE FORMATION OF MULTILAYER FINISH COATING FILM

TECHNICAL FIELD

The present invention relates to an aqueous two-package type clear coating composition and a process for forming a multilayer film having topcoat film using the same.

BACKGROUND ART

In recent years, environmental problems have become an issue of great concern on a global scale. In the automotive industry, environmental protection measures during manufacturing processes have been actively promoted. In automotive manufacturing processes, reducing the amount of volatile organic compounds (VOC) released during coating processes has become a particularly urgent task.

Outer panels of automobile bodies are usually coated with a multilayer coating film including an undercoating film formed of a cationic electrodeposition coating composition, an intermediate coating film and a topcoating film, to impart corrosion resistance and aesthetic appeal. In order to reduce the amount of VOC, the use of aqueous intermediate coating and topcoating compositions has been promoted.

From the viewpoint of the film properties, curability, film surface smoothness, etc., aqueous two-package type clear coating compositions containing a polyisocyanate compound as a cross-linking agent have been studied as clear coating compositions for use as topcoating compositions. However, polyisocyanate compounds are generally hydrophobic and therefore have problematic insufficient dispersion stability in aqueous coating compositions.

A method is carried out in which a polyisocyanate compound, which is used as a cross-linking agent in an aqueous coating composition, is dispersed using a nonionic surfactant as a dispersant. However, because of the poor surface activating ability of nonionic surfactants, it is necessary to use a large amount of nonionic surfactant to stably disperse the polyisocyanate compound in water. As a result, the coating film has low hardness and is insufficient in film properties such as acid resistance.

Further, as a self-emulsifiable polyisocyanate compound for aqueous coating compositions, a modified polyisocyanate compound obtained by reacting a polyisocyanate compound with a hydrophilic surfactant having an active hydrogen group that can be reactive with an NCO group, is known.

Japanese Unexamined Patent Publication No. 1995-113005 discloses a polyisocyanate compound modified with a nonionic compound such as a polyalkylene ether alcohol or the like. The publication also discloses that the dispersion stability of a polyisocyanate can be improved by the introduction of a hydrophilic chain, such as a polyalkylene ether alcohol, into the polyisocyanate. The publication proposes an aqueous coating composition expected to have both the dispersion stability of the polyisocyanate in the aqueous coating composition and the stability of the NCO group.

However, when the polyisocyanate is modified with a nonionic compound having no polar group, the use of a compound with a long-chain nonionic group moiety is necessary in order to achieve sufficient water dispersion stability. Thus, the polyisocyanate compound has a soft structure, and therefore, the coating film obtained using the polyisocyanate compound as a cross-linking agent has reduced hardness, causing problematic insufficient film properties.

Japanese Unexamined Patent Publication No. 1995-113005 also discloses a polyisocyanate compound modified with an ionic compound such as a fatty acid salt, a sulfonic acid salt, a phosphoric acid ester, a sulfuric acid ester salt, or like anionic compound. However, the publication discloses that the use of an ionic compound often influences the reactivity of the isocyanate, as well as the coloration and deterioration of the coating film, and causes problems such as precipitation, agglomeration, etc., depending on the ionicity of the aqueous resin and the resin for use as the main component of the coating agent.

Japanese Unexamined Patent Publication No. 2003-533566 proposes an aqueous coating composition obtained using a sulfonic acid-modified polyisocyanate compound obtained by reacting a polyisocyanate compound with a specific sulfonic acid compound, so as to improve the dispersion stability in the aqueous coating composition.

However, coating compositions obtained using a polyisocyanate compound modified with an ionic compound, such as the above-mentioned aqueous coating composition, have problematic marked yellowing of the coating films due to overbaking, when the coating compositions are used as clear coating compositions in 2-coat 1-bake methods.

Further, aqueous two-package type clear coating compositions containing a polyisocyanate compound as a cross-linking agent have problems such as likely foaming of the coating films during curing, and insufficient finish appearance properties of the coating films, such as film surface smoothness and the like.

Japanese Unexamined Patent Publication No. 2000-506195 discloses a composition comprising a compound containing an anionic functional group and a polyethylene glycol chain fragment, and an isocyanate. The publication also discloses a two-package type coating composition comprising the isocyanate composition and an acrylic polymer containing an acidic group and a hydroxyl group. However, the coating film obtained in the publication is insufficient in foaming resistance and film surface smoothness.

DISCLOSURE OF THE INVENTION

Problems to be Solved by the Invention

An object of the present invention is to provide as a clear coating composition used in an automobile top coating application, as represented by a two-coat one-bake metallic coating, an aqueous two-package type clear coating composition having excellent dispersion stability of a polyisocyanate compound, the coating composition being capable of forming a coating film with excellent film properties such as coating film hardness, acid resistance, scratch resistance and heat yellowing resistance, antifoaming properties during curing and finish appearance such as surface smoothness, etc.; and a process for forming a multilayer topcoat film using the same.

Means to Solve the Problem

The present inventors carried out extensive research on the base resin and the polyisocyanate curing agent in the aqueous two-package type clear coating composition in view of heat yellowing resistance, foaming resistance, surface smoothness, etc. As a result, they found that when an aqueous two-package type clear coating composition comprising an aqueous dispersion of a specific acrylic resin, the resin including a secondary hydroxyl group as a cross-linking functional group, and a polyisocyanate curing agent obtained by mixing a polyisocyanate compound and a compound having a specific functional group is used, the above objects can be achieved. The present invention has been accomplished based on this finding.

The present invention provides the following aqueous two-package type clear coating composition and process for forming a multilayer topcoat film.

Item 1. An aqueous two-package type clear coating composition comprising:
(A) an aqueous dispersion of a hydroxyl group- and acid group-containing acrylic resin having a hydroxyl value of 30 to 200 mg KOH/g, an acid value of 5 to 50 mg KOH/g, a weight average molecular weight of 3,000 to 30,000, and a glass transition temperature of −30 to +40° C. obtained by radical polymerization of 10 to 50 mass % of (a) a secondary hydroxyl group-containing monomer and 50 to 90 mass % of (b) other unsaturated monomer; and
(B) a polyisocyanate curing agent obtained by mixing (c) a polyisocyanate compound and (d) a compound containing an anionic functional group, a polyoxyethylene group, and a hydrocarbon group.

Item 2. The coating composition according to Item 1, wherein the curing agent (B) is obtained by mixing the compound (c) and the compound (d), the compound (d) being 0.5 to 25 parts by mass per 100 parts by mass of the compound (c).

Item 3. The coating composition according to Item 1, wherein the compound (d) is a compound comprising a phosphate group, a polyoxyethylene group, and a hydrocarbon group.

Item 4. The coating composition according to Item 1, wherein the monomer (a) is at least one member selected from the group consisting of 2-hydroxypropyl (meth)acrylate, 2-hydroxybutyl (meth)acrylate, 3-hydroxybutyl (meth)acrylate, and adducts of (meth)acrylic acids and epoxy group-containing compounds.

Item 5. The coating composition according to Item 4, wherein the monomer (a) is 2-hydroxypropyl (meth)acrylate.

Item 6. The coating composition according to Item 1, wherein the aqueous dispersion (A) comprises an acrylic resin obtainable by using 5 to 30 mass % of at least one (meth)acrylate having a branched $C_{8-18}$ alkyl group as the monomer (b).

Item 7. The coating composition according to Item 1, which further comprises a hindered phenolic-based antioxidant (C).

Item 8. The coating composition according to Item 1, which further comprises an ultraviolet absorber (D).

Item 9. The coating composition according to Item 1, which further comprises an active hydrogen-containing light stabilizer (E).

Item 10. The coating composition according to Item 1, wherein the lowest viscosity of the coating composition as measured at a temperature of 30 to 150° C. at a frequency of 0.1 Hz is 30 Pa·s or less.

Item 11. The coating composition according to Item 1, wherein the melt viscosity of the aqueous dispersion (A) as measured at a solids content of at least 96 mass % at a shear rate of 564 $s^{-1}$ at 140° C. is 1 to 12 Pa·s.

Item 12. The coating composition according to Item 1, wherein the equivalent ratio (NCO/OH) of isocyanate groups of the curing agent (B) to hydroxyl groups of the acrylic resin in the aqueous dispersion (A) is 0.5 to 2.0.

Item 13. The coating composition according to Item 1, wherein the solids content is 35 to 65 mass %.

Item 14. A process for forming a multilayer topcoat film comprising forming on a substrate at least one base coat layer and at least one clear coat layer in that order, wherein the aqueous two-package type clear coating composition according to Item 1 is applied as the uppermost top clear coat composition.

Item 15. A process for forming a multilayer topcoat film, comprising applying as a base coating composition a thermosetting aqueous coating composition to a substrate, applying the aqueous two-package type clear coating composition according to Item 1 as a clear coating composition to the uncured base coat surface, and then curing the resulting two coating layers simultaneously.

The aqueous two-package type clear coating composition and the process for forming a multilayer topcoat film of the invention are described below in detail.

Aqueous Two-package Type Clear Coating Composition

The coating composition of the present invention is an aqueous two-package type clear coating composition, which comprises (A) an aqueous dispersion of a hydroxyl group- and acid group-containing acrylic resin having a hydroxyl value of 30 to 200 mg KOH/g, an acid value of 5 to 50 mg KOH/g, a weight average molecular weight of 3,000 to 30,000, and a glass transition temperature of −30 to +40° C. obtained by radical polymerization of 10 to 50 mass % of (a) a secondary hydroxyl group-containing monomer and 50 to 90 mass % of (b) other unsaturated monomer; and (B) a polyisocyanate curing agent obtained by mixing (c) a polyisocyanate compound and (d) a compound containing an anionic functional group, a polyoxyethylene group, and a hydrocarbon group.

(A) Aqueous Dispersion of Hydroxyl Group- and Acid Group-containing Acrylic Resin The aqueous dispersion of acrylic resin (A) is prepared by dispersing in water a hydroxyl group- and acid group-containing acrylic resin with a hydroxyl value of 30 to 200 mg KOH/g, an acid value of 5 to 50 mg KOH/g, a weight average molecular weight of 3,000 to 30,000, and a glass transition temperature of −30 to +40° C. obtained by radical polymerization of 10 to 50 mass % of (a) a secondary hydroxyl group-containing monomer and 50 to 90 mass % of (b) other unsaturated monomer(s) to form an aqueous dispersion of a particulate resin.

The hydroxyl group of the acrylic resin mainly acts as a functional group for the reaction of the acrylic resin in dispersion (A) with curing agent (B). The acid group mainly imparts water dispersibility to the resin, and also acts as an internal catalyst for the cross-linking reaction of the acrylic resin in dispersion (A) with polyisocyanate curing agent (B).

Hydroxyl group- and acid group-containing acrylic resins can be produced by copolymerizing (a) a secondary hydroxyl group-containing monomer and (b) other unsaturated monomer(s) according to usual methods.

Secondary hydroxyl group-containing monomer (a) is a compound containing one secondary hydroxyl group and one polymerizable unsaturated bond per molecule.

Examples of secondary hydroxyl group-containing monomer (a) include 2-hydroxypropyl (meth)acrylate, 2-hydroxybutyl (meth)acrylate, 3-hydroxybutyl (meth)acrylate, and like hydroxyalkyl (meth)acrylates in which the alkyl moiety has 3 to 6, in particular 3 or 4 carbon atoms; and adducts of (meth)acrylic acids with epoxy group-containing compounds such as "Cardula E10" (tradename; produced by Hexion Speciality Chemicals Inc., glycidyl ester of neodecanoic acid.) Of these, 2-hydroxypropyl (meth)acrylate is preferable.

Monomer (a) can be used singly or as a mixture of two or more.

In this specification, "(meth)acrylate" means acrylate and/or methacrylate. "(Meth)acrylic acid" means acrylic acid and/or methacrylic acid. "(Meth)acryloyl" means acryloyl and/or methacryloyl.

Other unsaturated monomer (b) is a monomer other than secondary hydroxyl group-containing monomer (a). Specifically, unsaturated monomer (b) includes one polymerizable unsaturated bond per molecule. Specific examples of unsaturated monomer (b) are listed in (1) to (8).

(1) Acid Group-containing Monomers

The acid group-containing monomer is a compound having one acid group and one polymerizable unsaturated bond per molecule. Examples of such monomers include carboxyl group-containing monomers such as (meth)acrylic acid, crotonic acid, itaconic acid, maleic acid, and maleic anhydride; sulfonic acid group-containing monomers such as vinylsulfonic acid and sulfoethyl (meth)acrylate; acid phosphate monomers such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid; and the like.

The amount of acid group-containing monomer may be any amount such that the acrylic resin has an acid value of about 5 to about 50 mg KOH/g. The acid group-containing monomer is an essential component for the acrylic resin of the coating composition of the present invention.

(2) Hydroxyl Group-(Other than Secondary Hydroxyl Groups) Containing Monomers

The hydroxyl group-containing monomer is a compound containing one hydroxyl group (other than secondary hydroxyl groups) and one polymerizable unsaturated bond per molecule. Examples of such monomers include monoesterified products (other than those containing a secondary hydroxyl group) of (meth)acrylic acid with a dihydric alcohol having 2 to 10 carbon atoms, such as 2-hydroxyethyl (meth)acrylate, 3-hydroxypropyl (meth)acrylate, 4-hydroxybutyl (meth)acrylate and the like; modified hydroxyl group-containing monomers (other than those containing a secondary hydroxyl group) obtained by ring-opening polymerization of ε-caprolactone; etc.

Commercially available products can be used as such hydroxyl group-containing monomers modified by ring-opening polymerization of ε-caprolactone. Examples of such commercially available products include "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4", and "PLACCEL FM-5" (trade names; products of Daicel Chemical Industries, Ltd.).

When a hydroxyl group-(other than secondary hydroxyl groups) containing monomer is used, the total amount of the monomer and secondary hydroxyl group-containing monomer (a) may be any amount such that the resulting acrylic resin has a hydroxyl value of about 30 to about 200 mg KOH/g.

(3) Monoesterified Products of Acrylic or Methacrylic Acid and a Monohydric Alcohol Having 1 to 20 Carbon Atoms.

Examples thereof include methyl (meth)acrylate, ethyl (meth)acrylate, propyl (meth)acrylate, butyl acrylate, n-butyl (meth)acrylate, iso-butyl (meth)acrylate, tert-butyl (meth) acrylate, 2-ethylhexyl (meth)acrylate, cyclohexyl (meth) acrylate, lauryl (meth)acrylate, isobornyl (meth)acrylate, tridecyl (meth)acrylate, stearyl (meth)acrylate, isostearyl (meth)acrylate and the like.

(4) Aromatic Vinyl Monomers

Examples thereof include styrene, α-methylstyrene, vinyltoluene, and the like.

(5) Glycidyl Group-containing Vinyl Monomers

The glycidyl group-containing vinyl monomer is a compound having one glycidyl group and one polymerizable unsaturated bond per molecule. Examples of such monomers include glycidyl acrylate, glycidyl methacrylate, and the like.

(6) Polymerizable Unsaturated Bond-containing Amide Compounds

Examples thereof include acrylamide, methacrylamide, dimethylacrylamide, N,N-dimethylpropylacrylamide, N-butoxymethylacrylamide, N-methylolacrylamide, N-methylolmethacrylamide, diacetone acrylamide and the like.

(7) Other Vinyl Compounds

Examples thereof include vinyl acetate, vinyl propionate, vinyl chloride, vinyl versatate and the like. Examples of vinyl versatate include commercially available products such as "VEOVA9" and "VEOVA10" (trade names; produced by Japan Epoxy Resin Co., Ltd.), and the like.

(8) Polymerizable Unsaturated Bond-containing Nitrile Compounds

Examples thereof include acrylonitrile, methacrylonitrile and the like.

The monomers defined in (1) to (8) above can be used singly or in a combination of two or more as other unsaturated monomer (b).

In the present invention, it is preferable that unsaturated monomer (b) includes at least one (meth)acrylate having a $C_{8-18}$ (preferably $C_{8-12}$) alkyl group with a branched structure.

Specific examples include 2-ethylhexyl (meth)acrylate, isostearyl (meth)acrylate, (meth)acrylic acids-adducts of "Cardura E10P" (trade name; produced by Hexion Speciality Chemicals Inc; glycidyl ester of neodecanoic acid), and glycidyl (meth)acrylat-adducts of versatic acid (produced by Hexion Speciality Chemicals Inc.). Of these, 2-ethylhexyl (meth)acrylate, and isostearyl (meth)acrylate are preferable.

When using (meth)acrylate having a $C_{8-18}$ alkyl group with a branched structure, the (meth)acrylate is preferably used in an amount of 5 to 30 mass %, and more preferably 10 to 25 mass %, based on the total amount of monomers forming an acrylic resin. When (meth)acrylate having a $C_{8-18}$ alkyl group with a branched structure is used within the above range, the acid resistance of the resulting coating film can be improved. Further, the water dispersibility of aqueous dispersion (A) is improved, and a coating composition with a high solids content can be obtained. This results in improved sagging resistance during application.

The hydroxyl group- or acid group-containing acrylic resin preferably has a hydroxyl value of about 30 to about 200 mg KOH/g, and more preferably about 50 to about 180 mg KOH/g. When the hydroxyl value is less than 30 mg KOH/g, the curability of the coating composition of the present invention may be insufficient, whereas when the value exceeds 200 mg KOH/g, the coating film may have poor water resistance.

From the viewpoint of antifoaming properties and surface smoothness, secondary hydroxyl group-containing monomer (a) is preferably contained in an amount of 50 mass % or more, and more preferably 80 mass % or more, based on the total amount of hydroxyl group-containing monomers used in the acrylic resin. There is no upper limit, but the upper limit is preferably 100 mass % or less.

The hydroxyl group- or acid group-containing acrylic resin has an acid value of about 5 to about 50 mg KOH/g, preferably about 10 to about 40 mg KOH/g. When the acid value is less than 5 mg KOH/g, the resulting aqueous dispersion may have poor dispersion stability. When the acid value exceeds 50 mg KOH/g, the coating film may have insufficient water resistance.

To provide a coating film with excellent acid resistance and surface smoothness, the hydroxyl group- and acid group-containing acrylic resin preferably has a weight average molecular weight of about 3,000 to about 30,000, and more preferably about 5,000 to about 20,000.

In this specification, the weight average molecular weight of the resins was determined by gel permeation chromatography (GPC) relative to polystyrene standards. In the Production Examples, etc., measurements were made using a GPC apparatus "HLC8120GPC" (trade name; produced by Tosoh Corporation) together with four columns "TSKgel G-4000 HXL", "TSKgel G-3000 HXL", "TSKgel G-2500 HXL" and "TSKgel G-2000 HXL" (trade names; produced by Tosoh Corporation) under the following conditions: mobile phase, tetrahydrofuran; measurement temperature, 40° C.; flow rate, 1 cc/min.; and detector, RI.

The acrylic resin preferably has a glass transition temperature of about −30° C. to about +40° C., more preferably about −20° C. to about +20° C. When the glass transition temperature is within the above range, a coating film has excellent hardness and surface smoothness.

In this specification, the glass transition temperature was determined at a temperature increase rate of 10° C./min. by DSC (differential scanning calorimetry) according to JIS K7121 (method of measuring the transition temperature of plastics). In the Production Examples, etc., measurements were made using a DSC apparatus "SSC5200" (trade name; produced by Seiko Instruments, Inc.) after a specific amount of sample was placed on a sample tray and dried at 130° C. for 3 hours.

The mixing proportion of secondary hydroxyl group-containing monomer (a) and other unsaturated monomer (b) is as follows: secondary hydroxyl group-containing monomer (a) is contained in an amount of about 10 to about 50 mass %, preferably about 25 to about 40 mass %; other unsaturated monomer (b) is contained in an amount of about 50 mass % to about 90 mass %, and preferably about 60 mass % to 75 mass %, based on the total amount of monomers. When secondary hydroxyl group-containing monomer (a) is contained in an amount of less than 10 mass %, the cured coating film may have insufficient surface smoothness or foaming resistance. When monomer (a) exceeds 50 mass %, the coating film may have insufficient curability.

The polymerization of the acrylic resin may be single-stage or multistage (i.e., two or more stages) polymerization. In solution polymerization, the polymerization reaction is generally performed by a single-stage polymerization method, which comprises adding an unsaturated monomer component and a polymerization initiator dropwise at the same time in the presence of a solvent for a certain period. Multistage polymerization is a method comprising separating an unsaturated monomer component into two or more monomer components, adding separated unsaturated monomer components dropwise in stages rather than adding unsaturated monomer components dropwise at the same time.

In the present invention, to achieve excellent dispersion stability of aqueous acrylic resin dispersion (A) and a coating composition, an acrylic resin obtained by multistage polymerization, i.e., two or more stage polymerization is preferably used.

Specifically, an acrylic resin obtained by a two-stage polymerization method, in which a monomer component not containing or substantially not containing any acid group-containing monomers is first polymerized, and a monomer component containing an acid group-containing monomer is added (dropwise) thereto, can be used as an acrylic resin having good dispersion stability.

An acrylic resin obtained as above is dispersed in water to form aqueous acrylic particulate resin dispersion (A).

The particulate resin preferably has a mean particle size of about 50 to about 300 nm to achieve excellent coating film surface smoothness and dispersion stability.

The dispersion of the acrylic resin in water can be made, for example, in the following manner.

An acrylic resin is usually obtained in the form of an organic solvent solution, and the solvent is distilled off under reduced pressure to a solids content of 95 mass % or more. The reduced pressure distillation is preferably performed while maintaining a reaction temperature (e.g., 145° C.) of resin preparation, without cooling, in accordance with a usual method. The temperature during the reduced pressure distillation is set to an optimal temperature according to the kind of solvent used in the preparation of the resin. To reduce the amount of VOCs, the organic solvent is preferably distilled off as much as possible. After the organic solvent is distilled off under reduced pressure, for example, a neutralizing agent is added at about 90° C. to neutralize the resin solution, after which a specific amount of deionized water is added dropwise under stirring at about 80° C., thus producing aqueous dispersion of hydroxyl group- and acid group-containing particulate resin (A).

Examples of preferable neutralizing agents include ammonia, ethylamine, isopropylamine, cyclohexylamine, dipropylamine, dibutylamine, triethylamine, tributylamine, ethylenediamine, morpholine, pyridine, isopropanolamine, methylisopropanolamine, dimethylethanolamine, aminomethylpropanol, diisopropanolamine, diethanolamine, triethanolamine, diethylethanolamine and like amine compounds.

The amount of neutralizing agent can be suitably selected. To provide excellent dispersion stability, the amount of neutralizing agent is preferably about 0.4 to about 0.9 equivalents, and particularly preferably about 0.5 to about 0.8 equivalents per acid group of the acrylic resin. In the aqueous dispersion, emulsifiers may, if necessary, be used to improve dispersibility.

In the aqueous two-package type clear coating composition of the present invention, the particulate acrylic resin in aqueous dispersion (A) preferably has a mean particle size of about 50 to about 300 nm, more preferably about 100 to about 250 nm, and even more preferably about 100 to about 200 nm. When the mean particle size of the dispersed resin particles is less than 50 nm, aqueous dispersion (A) may have high viscosity and poor antifoaming properties, etc. When the mean particle size exceeds 300 nm, the coat surface may have insufficient smoothness.

In this specification, the mean particle size of the particulate resin is a value obtained by measurement at 20° C. using a submicron particle size distribution analyzer after the particulate resin is diluted with deionized water according to the usual method. Examples of submicron particle size distribution analyzers include the "COULTER N4" (trade name; produced by Beckman Coulter, Inc.).

To provide excellent surface smoothness, application workability and film hardness, the melt viscosity of the aqueous acrylic resin dispersion (A) as measured at a solids content of at least 96 mass % at a shear rate of 564 s$^{-1}$ at 140° C. is preferably about 1 to about 12 Pa·s, more preferably about 1 to about 8 Pa·s, and further preferably about 1 to about 6 Pa·s.

The melt viscosity of the hydroxyl group- and acid group-containing particulate resin at a solids content of at least 96 mass % means that the aqueous dispersion (A) has a melt viscosity within the above-mentioned range when measured at any concentration not lower than 96 mass % on a solids basis.

The viscosity mainly depends on properties such as the weight average molecular weight and glass transition point of the acrylic resin. For example, when the weight average molecular weight is 3,000 to 30,000, and the glass transition temperature is within the range of −30° C. to +40° C., the acrylic resin has a viscosity within the above range.

In this specification, the melt viscosity of aqueous dispersion (A) of the acrylic resin was determined by applying aqueous dispersion (A) to a glass plate using an applicator, drying at 130° C. for about 3 hours to a solids content of at least 96 mass %, and then measuring the viscosity at 140° C. at a shear rate of 564 s$^{-1}$ using a cone-and-plate viscosity meter. In the Production Examples, measurements were made using a "VISCONE CV-1" (trade name; produced by Misec Corporation) as a cone-and-plate viscosity meter, together with a 100P rotor (cone diameter: 14.5 mm, corn angle: 2°).

Aqueous dispersion (A) can be used singly or in a combination of two or more as long as the dispersion is obtained by dispersing the acrylic resin in water.

To provide an aqueous dispersion with excellent stability, aqueous dispersion (A) preferably has a solids content of about 35 to about 65 mass %. In the Production Examples etc., the solids content was calculated by placing about 2.0 g of the aqueous dispersion in an aluminum foil cup with a diameter of about 5 cm, heating at 110° C. for 1 hour and measuring the amount of residue (g).

To provide an aqueous dispersion with excellent stability, aqueous dispersion (A) preferably has a B-type viscosity of about 400 to about 1,000 mPa·s, and more preferably about 500 to about 900 mPa·s. In the Production Examples etc., the viscosity was measured at 20° C. at 60 rpm using a Brookfield viscometer.

To provide an aqueous dispersion with excellent stability, aqueous dispersion (A) preferably has a pH of about 6.0 to about 8.5, and more preferably about 6.5 to about 8.0. In the Production Examples, etc., the pH was measured using a pH meter. Examples of pH meters include "F-22" (trade name; produced by Horiba Ltd.).

(B) Polyisocyanate Curing Agent

Polyisocyanate curing agent (B) is a curing agent obtained by mixing (c) a polyisocyanate compound and (d) a compound containing an anionic functional group, a polyoxyethylene group, and a hydrocarbon group. In the present invention, compound (c) is mixed with compound (d) in advance, which imparts excellent dispersion stability to polyisocyanate compound (c) in the curing agent (B). As a result, a coating film obtained from an aqueous two-package type clear coating composition comprising aqueous dispersion (A) and curing agent (B) has excellent coating film performances such as hardness, acid resistance, etc., and excellent finish appearance such as surface smoothness when cured.

Polyisocyanate compound (c) is the curing agent of the coating composition, which has at least two isocyanate groups per molecule. Examples of polyisocyanate compound (c) include those known for use in the production of polyurethanes, such as aliphatic polyisocyanates, alicyclic polyisocyanates, aliphatic-aromatic polyisocyanates, aromatic polyisocyantates, and derivatives thereof.

Examples of aliphatic polyisocyanates include trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl-caproate and like aliphatic diisocyanates; lysine ester triisocyanate, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanato-5-isocyanato methyloctane and like aliphatic triisocyanates; etc.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane, norbornane diisocyanate and like alicyclic diisocyanates; 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)-bicyclo[2.2.1]heptane, 3-(3-isocyanatopropyl)-2,5-di(isocyanatomethyl)-bicyclo[2.2.1]heptane, 5-(2-isocyanatoethyl)-2-isocyanatomethyl-3-(3-isocyanatopropyl)-bicyclo[2.2.1]heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)-bicyclo[2.2.1]heptane, 6-(2-isocyanatoethyl)-2-isocyanatomethyl-2-(3-isocyanatopropyl)-bicyclo[2.2.1]heptane and like alicyclic triisocyantes; etc.

Examples of aliphatic-aromatic polyisocyanates include 1,3- or 1,4-xylylene diisocyanate or a mixture thereof, ω,ω-diisocyanato-1,4-diethylbenzene, 1,3- or 1,4-bis(1-isocyanato-1-methylethyl)benzene (common name: tetramethylxylylene diisocyanate) or a mixture thereof, and like aliphatic-aromatic diisocyanates; 1,3,5-triisocyanate methylbenzene and like aliphatic-aromatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, 4,4'-diphenylether diisocyanate and like aromatic diisocyanates; triphenylmethane-4,4',4'''-triisocyanate, 1,3,5-triisocyanato benzene, 2,4,6-triisocyanato toluene and like aromatic triisocyanates; 4,4'-diphenylmethane-2,2',5,5'-tetraisocyanate and like aromatic tetraisocyanates; etc.

Examples of polyisocyanate derivatives include dimers, trimers, biurets, allophonates, carbodiimides, urethodiones, urethoimines, isocyanurates, iminooxadiazinediones and like derivatives of such polyisocyanate compounds.

Such polyisocyanates can be used singly or in a combination of two or more. Of these, in view of excellent weather resistance of the cured coating film, aliphatic diisocyanates, alicyclic diisocyanates, and derivatives thereof are preferably used, and hexamethylene diisocyanates (HDI), derivatives thereof, isophorone diisocyanates (IPDI) and derivatives thereof are more preferably used.

Compound (d), which is mixed earlier with compound (c), is a compound having an anionic functional group, a polyoxyethylene group, and a hydrocarbon group, and acts as a surfactant in the coating composition.

There are no limitations on compound (d), insofar as the compound contains an anionic functional group, a polyoxyethylene group, and a hydrocarbon group. Specific examples include a compound obtained by reaction of a compound with an anionic functional group and a compound with a polyoxyethylene group and hydrocarbon group.

Examples of compounds having an anionic functional group include fatty acid salt compounds, sulfonic acid compounds such as sulfonic acid and sulfonic acid salts, phosphoric acid compounds such as phosphoric acid, phosphoric acid ester, anionic compounds such as sulfuric acid ester salt compounds, and the like.

The polyoxyethylene group- and hydrocarbon group-containing compound is a compound having a hydrophobic group-moiety based on a polyoxyethylene group and a hydrocarbon group. Generally, the hydrophobic group-moiety is selected from alkyl groups, aralkyl groups, alkyl aryl groups, and aryl groups. A polyoxyethylene group has a structure comprising ethylene oxide repeating units represented by the formula: $(CH_2CH_2O)_n$. In compound (d), n in the formula "$(CH_2CH_2O)_n$" is 2 or more, preferably 6 to 20, and more preferably 8 to 16. Preferable examples of the hydrophobic group-moiety include linear, branched, or cyclic $C_{6-16}$ alkyl groups, $C_{6-16}$ aralkyl groups, $C_{6-16}$ alkyl aryl groups, and $C_{6-16}$ aryl groups.

Specific examples of compounds having a polyoxyethylene group and a hydrocarbon group include monohydric alcohols having a polyoxyethylene group and a hydrocarbon group. Examples of monohydric alcohols having a polyoxyethylene group and a hydrocarbon group can be produced by, for example, reacting alcohol with ethylene oxide. Specific examples include polyethylene glycol octyl ether, polyethylene glycol nonyl ether, polyethylene glycol dodecylether, polyethylene glycol tridecyl ether, polyethylene glycol nonylphenyl ether, etc.

Since compound (d) that comprises the aforementioned anionic functional group and polyoxyethylene group and has a hydrocarbon group at the end has high surface activating ability, polyisocyanate compound (c), which is a curing agent, can be stably dispersed at a high concentration in the coating composition of the present invention. An anionic functional group may be neutralized in an amine compound or the like.

From the viewpoint of excellent surface activating ability, compound (d) is preferably phosphoric acid polyoxyethylene alkyl ether, and more preferably phosphoric acid polyoxyethylene tridecyl ether and phosphoric acid polyoxyethylene nonylphenyl ether.

Such compounds (d) are described as surfactants, for example, in the international publication, WO 97/31960.

Compound (d) can be used singly or in a combination of two or more.

From the viewpoint of the dispersibility of polyisocyanate compound (c) in the coating composition, polyisocyanate curing agent (B), obtained by mixing polyisocyanate compound (c) and compound (d) earlier, can be used in the present invention.

The mixing ratio of polyisocyanate compound (c) and compound (d) is as follows: the amount of compound (d) is preferably about 0.5 to about 25 parts by mass, more preferably about 1 to about 20 parts by mass, even more preferably about 2 to about 15 parts by mass, and particularly preferably about 3 to about 10 parts by mass, per 100 parts by mass of polyisocyanate compound (c).

From the viewpoint of dispersion stability, an amine compound may be added to polyisocyanate curing agent (B).

In the aqueous two-package type clear coating composition of the present invention, the equivalent ratio (NCO/OH) of isocyanate groups of curing agent (B) to hydroxyl groups of the hydroxyl group- and acid group-containing acrylic particulate resin in aqueous dispersion (A) is preferably about 0.5 to about 2.0, and more preferably about 0.8 to about 1.5, in view of excellent curability of the composition and coating composition stability.

In addition to polyisocyanate curing agent (B), a melamine resin may be optionally used as a curing agent in the aqueous two-package type clear coating composition of the present invention to obtain a coating film with improved adhesion between layers.

There is no limitation on melamine resins. Specific examples include di-, tri-, tetra-, penta-, and hexa-methylolmelamines; alkyl-etherified products of methylolmelamines with an alcohol (alkyl examples include methyl, ethyl, propyl, isopropyl, butyl, isobutyl, 2-ethylhexyl, etc.); and condensates thereof.

Examples of preferable melamine resins include a melamine resin in which an average of three or more methylol groups per triazine nucleus are methyletherified; and a hydrophilic imino group-containing melamine resin in which part of the methoxy groups are substituted by an monohydric alcohol having two or more carbon atoms, the average degree of condensation is about 2 or less, and one nuclide accounts for about 50 mass % or more of the resin.

Examples of usable melamine resins include "Cymel 303", "Cymel 323", "Cymel 325", "Cymel 327", "Cymel 350", "Cymel 370", "Cymel 380", "Cymel 385" and "Cymel 254" (produced by Mitsui Cytec Industries, Inc.); "Resimene 735", "Resimene 740", "Resimene 741", "Resimene 745", "Resimene 746" and "Resimene 747" (produced by Monsanto Co., Ltd.), "SUMIMAL M55", "SUMIMAL M30W" and "SUMIMAL M50W" (produced by Sumitomo Chemical Co., Ltd.); and "U-VAN" series such as "U-VAN 20SE" (produced by Mitsui Chemicals, Inc.); etc. Such melamine resins can be used singly or in a combination of two or more.

When a melamine resin is used as a curing agent, para-toluenesulfonic acid, dodecylbenzenesulfonic acid, dinonylnaphthalenesulfonic acid and like sulfonic acids; and salts of such acids and amine can be used as a catalyst.

In the aqueous two-package type clear coating composition of the present invention, the mass ratio of aqueous dispersion (A) to polyisocyanate compound (c) in polyisocyanate curing agent (B) on a solids basis is not strictly limited, and is preferably within the range of about 50/50 to about 80/20, and more preferably within the range of about 60/40 to about 75/25.

Hindered Phenol Antioxidant (C)

To improve heat yellowing resistance of the coating film due to overbaking, it is preferable to add hindered phenol antioxidant (C) to the aqueous two-package type clear coating composition.

Examples of hindered phenol antioxidant (C) include pentaerythritol tetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphate, 3,3',3",5,5',5"-hexa-tert-butyl-a,a',a"-(mesitylene-2,4,6-triyl)tri-p-cresol, calcium diethylbis[[[3,5-bis(1,1-dimethylethyl)-4-hydroxyphenyl]methyl]phosphonate], 4,6-bis(octylthiomethyl)-o-cresol, ethylene bis(oxyethylene)bis[3-(5-di-tert-butyl-4-hydroxy-m-tolyl) propionate], hexa methylenebis[[3-(3,5-di-tert-butyl-4-hydroxyphenyl)propionate, 1,3,5-tris(3,5-di-tert-4-butyl-4-hydroxybenzyl)-1,3,5-triazine-2,4,6(1H,3H,5H)-trione, 1,3,5-tris(4-tert-butyl-3-hydroxy-2,6-xylyl)methyl]-1,3,5-triazine 2,4,6(1H,3H,5H)-trione, reaction products of N-phenylbenzene amine and 2,4, 4-trimethyl pentene, 2,6-di-tert-butyl-4-(4,6-bis (octylthio)-1,3,5-triazine-2-ylamino)phenol, etc. They are known products and commercially available. Specific examples include "IRGANOX1010", "IRGANOX1010EP", "IRGANOX1010FF", "IRGANOX1035", "IRGANOX1035FF", "IRGANOX1076", "IRGANOX1076FF", "IRGANOX1076FD", "IRGANOX1076DW", "IRGANOX1135", "IRGANOX1141", "IRGANOX1222", "IRGANOX1330", "IRGANOX1425", "IRGANOX1520", "IRGANOX245", "IRGANOX245FF", "IRGANOX245DW", "IRGANOX259", "IRGANOX3114", "IRGANOX3739", "IRGANOX5057", "IRGANOX565", "IRGANOX565DD" (trade names; produced by Ciba Specialty Chemicals K.K.), and "SUMILIZER GA80" (trade name; produced by Sumitomo Chemical Co., Ltd.).

The mixing proportion of the hindered phenolic antioxidant can be arbitrarily selected. Generally, the proportion is preferably 0.1 to 5 parts by mass, and more preferably 0.5 to 2 parts by pass, per 100 parts by mass of the total solids of aqueous dispersion (A) and polyisocyanate compound (c).

To facilitate dispersion in water, a method in which hindered phenolic antioxidant (C) is dispersed earlier in aqueous dispersion (A) can be employed.

Examples of methods for dispersing antioxidant (C) in aqueous dispersion (A) earlier include a method comprising dissolving hindered phenolic antioxidant (C) in the resin solution finally obtained in the acrylic resin polymerization, and dispersing in water antioxidant (C) and the acrylic resin at the same time; a method comprising adding antioxidant (C) to a monomer used as a starting material for the polymerization of the resin to introduce the antioxidant into a acrylic resin solution, and dispersing antioxidant (C) together with the acrylic resin in water; etc.

In addition to hindered phenolic antioxidant (C), thioether-based, phosphate-based antioxidants can also be used, if required.

UV Absorber (D)

If necessary, the aqueous two-package type clear coating composition of the present invention may contain UV absorber (D). Examples of usable UV absorbers include triazine-based compounds, benzotriazole-based compounds, and the like. Of these, triazine-based compounds are preferable in view of heat yellowing resistance.

Examples of triazine-based compounds include 2-(4,6-diphenyl-1,3,5-triazine-2-yl)-5-[(hexyl)oxy]-phenol (e.g., "TINUVIN 1577FF"; trade name; produced by Ciba Specialty Chemicals), a mixture of 2-[4-[6-(2-hydroxy-3-dodecyloxypropyl)oxy]-2-hydroxyphenyl]-4,6-bis(2,4-dimethylphenyl)-1,3,5-triazine and 2-[4-[6-(2-hydroxy-3-dodecyloxypropyl)oxy]-2-hydroxyphenyl]-4,6-bis(2,4-dimethylphenyl)-1,3,5-triazine (e.g., "TINUVIN 400"; trade name; produced by Ciba Specialty Chemicals), 2,4-bis(2,4-dimethylphenyl)-6-(2-hydroxy-4-iso-octyloxyphenyl)-s-triazine (e.g., "TINUVIN 411L"; trade name; produced by Ciba Specialty Chemicals), 2,4-bis(2,4-dimethylphenyl)-6-(2-hydroxy-4-octyloxyphenyl)-1,3,5-triazine (e.g., "Cyagard UV-1164L"; trade name; produced by Mitsui-Cytec Ltd.), and the like.

Examples of benzotriazole-based compounds include 2-(2'-hydroxy-5'-methylphenyl)benzotriazole, 2-[2'-hydroxy-3',5'-di(1,1-dimethylbenzyl)phenyl]-2H-benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-amylphenyl)benzotriazole, 2-(2'-hydroxy-3',5'-di-tert-butylphenyl)-5-chlorobenzotriazole, 2-(2'-hydroxy-3',5'-di-isoamylphenyl)benzotriazole, 2-(2'-hydroxy-5'-tert-butylphenyl)benzotriazole, and the like.

When triazine-based compound and/or a benzotriazole-based compound are added, the compound(s) can be dispersed in aqueous dispersion (A) in advance to facilitate dispersion in water.

Here, examples of methods for dispersing a compound in aqueous dispersion (A) in advance include a method comprising dissolving a compound in an acrylic resin solution and dispersing the compound together with the acrylic resin in water; a method comprising dissolving the compound(s) with a monomer used as a starting material for the polymerization to introduce the compound(s) into a acrylic resin solution, and dispersing the compound together with the acrylic resin in water; etc.

Such UV absorber (D) can be used singly or in a combination of two or more.

The amount of UV absorber (D) is preferably about 0.1 to about 10 parts by mass, more preferably about 0.5 to about 5 parts by mass, and further preferably about 0.8 to about 3 parts by mass, per 100 parts by mass of the total amount of aqueous dispersion (A) and polyisocyanate compound (c), on a solids basis.

Active Hydrogen-containing Light Stabilizer (E)

Examples of active hydrogen-containing light stabilizer (E) include 2,2,4,4-tetramethyl-20-($\beta$-lauryl-oxycarbonyl)-ethyl-7-oxa-3,20-diazaspiro(5,1,11,2)heneciosan-diyl-one (Hostavin 3050, produced by Clariant Japan Co., Ltd.), $\beta$-alanine, N-(2,2,6,6-tetramethyl-4-piperidinyl)-dodecyl ester/tetradecyl ester (Hostavin 3052, produced by Clariant Japan Co., Ltd.), 2,4-bis[N-butyl-N-(1-cyclohexyloxy 2,2,6,6,-tetramethyl piperidine-4-yl)amino]-6-(2-hydroxyethylamine)-1,3,5-triazine (TINUVIN 152, produced by Ciba Speciality Chemicals.), etc.

Use of a light stabilizer containing no active hydrogen may cause surface abnormalities (blushing) because the light stabilizer moves to the surface of the coating film at high temperatures and high humidity. However, use of an active hydrogen-containing light stabilizer, which is capable of reacting with an isocyanate group, allows the stabilizer to be introduced in the cross-linking structure of the coating film, which reduces the movement of the stabilizer to the surface, preventing the aforementioned surface abnormalities. Therefore, active hydrogen-containing light stabilizers are preferable.

Light stabilizer (E) can be used singly or in a combination of two or more.

The amount of light stabilizer (E) is preferably 0.1 to 10 parts by mass, more preferably 0.5 to 5 parts by mass, and further preferably 0.8 to 3 parts by mass, per 100 parts by mass of the total amount of aqueous dispersion (A) and polyisocyanate compound (C), on a solids basis.

To facilitate dispersion of such light stabilizer (E) in water, usable methods include a method comprising dissolving the stabilizer in a solvent such as toluene, followed by dispersion in water using an emulsifier; a method comprising dissolving the stabilizer in the resin solution finally obtained in the acrylic resin polymerization, and dispersing the stabilizer and the acrylic resin in water at the same time; a method comprising adding the stabilizer to a monomer used as a starting material for the polymerization of the resin to introduce the stabilizer into a acrylic resin solution, and dispersing the stabilizer and the acrylic resin in water at the same time; etc.

The aqueous two-package type clear coating composition of the present invention may contain curing catalysts, rheology control agents, surface conditioners, coloring pigments, metallic pigments, light interference pigments, extender pigments and like additives, if required. The amount of coloring pigments, metallic pigments, photoluminescent pigments, extender pigments, etc. may be within the range that transparency of the coating film is not impaired.

Since polyisocyanate compound (c) is capable of easily cross-linking with hydroxyl groups at room temperature in the aqueous two-package type clear coating composition, aqueous acrylic resin dispersion (A) and polyisocyanate curing agent (B) are separate as a two-package type composition beforehand and mixed just before application. In this case, it is usually preferable that the UV absorbers, antioxidant's, light stabilizers and other additives which can be used if required, be incorporated as components of aqueous dispersion (A). Mixing can be performed using known mixing devices such as rotor blade stirrers, homogenizers and the like.

The aqueous two-package type clear coating composition of the present invention preferably has a lowest viscosity of 30 Pa·s or less measured under the following conditions.

Condition for Measuring the Viscosity
Solids content: at least 90 mass %
Temperature: 30 to 150° C.
Frequency: 0.1 Hz The lowest viscosity value describes the lowest viscosity value that falls within the above-mentioned range when the viscosity of the composition is measured over the temperature range of 30 to 150° C. at a frequency of 0.1 Hz at any solids content not lower than 90 mass %.

The lowest viscosity value refers to the lowest complex viscosity during the melting of the components in the aqueous two-package type clear coating composition by heating and flowing after application of the aqueous two-package type clear coating composition.

In this specification, the lowest viscosity was determined using a viscoelasticity meter. In the Examples, etc., the viscosity was measured using a "Rheostress RS-150" viscoelasticity meter (trade name; produced by HAAKE).

More specifically, the measuring method is detailed below.
1) The aqueous two-package type clear coating composition whose viscosity as measured using Ford Cup No. 4 at 20° C. had been adjusted to 30 seconds was applied by air spraying to the surface of a tin plate (300×450×0.3 mm) degreased with isopropanol to a film thickness of 35 μm (when dried) and heated at 60° C. for about 10 to about 15 minutes.
2) The uncured coating film formed on the tin plate was scraped off and collected into a sample bottle, which was sealed immediately by closing the cap.
3) Using 1.0 g of resulting sample, the dynamic viscoelasticity was measured using a "Rheostress RS-150" under strain control (frequency: 0.1 Hz, strain: 1.0, sensor: parallel plate ($\phi$=20 mm), gap: 0.5 mm, temperature increase rate: 6° C./min.) over the temperature range of 30 to 150° C. to determine the lowest complex viscosity.

The solids content of the uncured coating film formed on the tin plate after the heating at 60° C. for 10 to 15 minutes was calculated by placing about 2.0 g of the sample in an aluminum foil cup about 5 cm in diameter, heating at 110° C. for 1 hour and then measuring the amount of residue (g). Generally, the solids content of the uncured coating film formed on the tin plate after the heating at 60° C. for 10 to 15 minutes is 90 mass % or more.

When the lowest viscosity exceeds 30 Pa·s, the aqueous two-package type clear coating composition when heated after application has an increased solids content and thus has low thermal flowability, which may result in problems such as poor surface smoothness, foaming, etc. of the obtained coating film.

Herein, measurements were made at a solids content of at least 90 mass % because aqueous two-package type clear coating compositions when heated to flow after application usually have a high solids content of at least 90 mass %.

The viscosity mainly depends on the properties such as weight average molecular weight, glass transition point, etc. of the acrylic resin in dispersion (A), and the kinds and content of compound (c).

Coating Composition Preparation

The aqueous two-package type clear coating composition of the present invention is a two-package type coating composition comprising aqueous hydroxyl group- and acid group-containing particulate acrylic resin dispersion (A) and curing agent (B). When additives such as antioxidants, UV absorbers, light stabilizers and other additives are added to the aqueous two-package type clear coating composition of the present invention, additives can be added while mixing aqueous dispersion (A) and curing agent (B), or additives can be added earlier to either aqueous dispersion (A) or curing agent (B).

The coating composition of the present invention is stored in two packages of aqueous dispersion (A) and curing agent (B). Aqueous dispersion (A) and curing agent (B) can be mixed according to known methods before use.

When applied, the composition may be diluted with deionized water, if necessary. The viscosity is preferably adjusted to, for example, about 20 to about 60 seconds as measured at 20° C. using Ford Cup viscometer No. 4, and more preferably about 30 to 50 seconds. In this case, the solids content is preferably about 35 to about 65 mass %, and preferably about 40 to about 60 mass %.

The amount of VOCs in the aqueous two-package type clear coating composition of the present invention is preferably about 0 to about 300 g/l, and more preferably about 0 to about 150 g/l. Herein, VOC refers to volatile organic substances classified as "highly volatile organic compounds" or "volatile organic compounds" by the World Health Organization (WHO).

Application Method

The aqueous two-package type clear coating composition of the present invention can be advantageously used in the various application methods described below.

Substrate

Examples of substrates to be coated include bodies of automobiles, motorcycles, and like vehicles; parts thereof; etc. Examples of substrates also include those that constitute such vehicle bodies and the like, such as cold rolled steel sheets and plates, galvanized steel sheets and plates, zinc alloy-plated steel sheets and plates, stainless steel sheets and plates, tinned steel sheets and plates, and like steel sheets and plates, aluminum sheets and plates, aluminum alloy sheets and plates, and like metal substrates; plastic substrates; and the like. Usable substrates also include such vehicle bodies, parts, and metal substrates whose surfaces have been subjected to a chemical conversion treatment such as a phosphate treatment, chromate treatment, or the like. Usable substrates further include such vehicle bodies, metal substrates, and the like onto which an undercoat, such as an electrodeposition undercoat, and/or an intermediate coat, has been formed.

Application and Curing Method

The method of applying the coating composition of the present invention is not limited. For example, air spray coating, airless spray coating, rotary atomization coating, curtain coating and like application methods can be used to form a wet coat. In air spray coating, airless spray coating, and rotary atomization coating, an electrostatic charge may be applied, if necessary.

The coating composition is preferably applied to a film thickness of about 15 to about 80 μm (when cured), and more preferably about 20 to about 60 μm (when cured).

Heating can be performed by known heating means. For example, drying furnaces, such as hot air furnaces, electric furnaces, infrared induction heating furnaces, etc., can be used.

The heating temperature is usually about 80 to about 180° C., and preferably about 100 to about 160° C. The heating time is usually about 10 to about 40 minutes. Before the heating, if necessary, preheating at about 50° C. to about 80° C. for about 3 to about 10 minutes may be carried out to promote vaporization of volatile components such as water.

Method for Forming Multilayer Coating Film

The aqueous two-package type clear coating composition of the present invention exhibits excellent dispersion stability of the polyisocyanate compound, and is capable of forming a coating film with excellent properties such as acid resistance and scratch resistance, etc., and excellent coating appearance such as heat yellowing resistance, foaming resistance and surface smoothness, etc. Therefore, the composition of the invention is advantageously used as a clear coating composition for forming a top clear coat.

Thus, the multilayer topcoat formation method of the present invention is a method for forming on a substrate at least one base coat layer and at least one clear coat layer in that order, the uppermost top clear coat layer being formed by using the coating composition of the present invention. Particularly preferable substrates to which the topcoat formation method of the present invention can be applied are automobile bodies and parts thereof.

Specific examples of the multilayer formation method of the present invention include the following methods (a) to (c) wherein the aqueous two-package type clear coating composition of the present invention is used as a top clear coating composition.

Method (a): a two-coat method for forming a multilayer film, wherein a base coating composition and a top clear coating composition are applied in that order to a substrate.

Method (b): a three-coat method for forming a multilayer film, wherein a base coating composition, a clear coating composition and a top clear coating composition are applied in that order to a substrate.

Method (c): a three-coat method for forming a multilayer film, wherein a first base coating composition, a second base coating composition and a top clear coating composition are applied in that order to a substrate.

The steps for forming a film in methods (a), (b) and (c) are described below in detail.

In the above methods, the base coating composition and the clear coating composition can be applied by application methods such as air spray coating, airless spray coating, rotary atomization coating, etc. In such application methods, an electrostatic charge may be applied, if necessary.

Method (a)

In method (a), a known base coating composition can be used as the base coating composition. A colored base coating composition for automobile bodies or the like is preferably used as the base coating composition.

The colored base coating composition is an organic solvent-based or aqueous coating composition comprising a base resin, a curing agent, and a pigment such as a coloring pigment, a light interference pigment or the like. To reduce the amount of VOCs, an aqueous coating composition is preferably used as the colored base coating composition.

Examples of base resins include acrylic resins, vinyl resins, polyester resins, alkyd resins, urethane resins and the like. Such resins can be used singly or in a mixture. Such base resins have cross-linkable functional groups such as hydroxyl, epoxy, carboxyl, alkoxysilyl and like groups. Examples of curing agents include alkyl-etherified melamine resins, urea resins, guanamine resins, polyisocyanate compounds, blocked polyisocyanate compounds, epoxy compounds, carboxyl group-containing compounds and the like. Such curing agents can be used singly or in a mixture. The proportions of base resin and curing agent are preferably 50 to 90% by mass of base resin and 50 to 10% by mass of curing agent, based on the total amount of these components.

In method (a), the base coating composition is usually applied to a substrate to a film thickness of about 10 to about 50 μm (when cured). The applied base coating composition is either cured by heating at about 100 to about 180° C., preferably at about 120 to about 160° C., for about 10 to about 40 minutes, or is not cured, with the coated substrate being left to stand at room temperature for several minutes or being preheated at about 40 to about 100° C. for about 1 to about 20 minutes.

Subsequently, the clear coating composition of the present invention is applied as a top clear coating composition to a film thickness of about 10 to about 70 μm (when cured) and then heated to form a cured multilayer coating film. The heating is performed at about 100 to about 180° C., preferably at about 120 to about 160° C., for about 10 to about 40 minutes.

Of the above two-coat methods, the method comprising applying a base coating composition, applying a top clear coating composition without heat-curing the base coating layer, and then curing the resulting two coating layers simultaneously is referred to as a two-coat one-bake method. The method of applying and heat-curing a base coating composition and then applying and curing a top clear coating composition is referred to as a two-coat two-bake method.

Method (b)

In method (b), examples of usable base coating compositions are the same as those described in method (a). Examples of clear coating compositions are not particularly limited insofar as the compositions are used in transparent coating film formation. Examples thereof include those obtained by completely or almost completely removing pigments from such known base coating compositions as mentioned above. The clear coating composition of the present invention is used as a top clear coating composition. The clear coating composition of the present invention may be used as a clear coating composition.

In method (b), as in method (a), a base coating composition is applied to the substrate and either cured by heating, or not cured, with the coated substrate being left to stand at room temperature for several minutes or being preheated. Thereafter, a clear coating composition is applied to the base coat surface to a film thickness of about 10 to about 50 μm (when cured), and is either cured by heating at about 100 to about 180° C., preferably at about 120 to about 160° C., for about 10 to about 40 minutes, or is not cured, with the coated substrate being left to stand at room temperature for several minutes or being preheated.

Subsequently, the coating composition of the invention is applied as a top clear coating composition to a film thickness of about 10 to about 50 μm (when cured) and then heated to form a cured multilayer coating film. The heating conditions are as in method (a).

The method of applying a base coating composition, applying a clear coating composition without heat-curing the base coating layer, applying a top clear coating composition without curing the clear coating layer, and then curing the resulting three coating layers simultaneously is referred to as a three-coat one-bake method. The method of applying a base coating composition, applying a clear coating composition without heat-curing the base coating layer, curing the resulting two coating layers simultaneously and then applying and curing a top clear coating composition is referred to as a three-coat two-bake method. The method of applying and heat-curing a base coating composition, applying and curing a clear coating composition, and applying and curing a top clear coating composition is referred to as a three-coat three-bake method.

Method (c)

Examples of base coating compositions usable as the first base coating composition in method (c) are the same as those described in method (a). The second base coating composition is applied to the first base coat surface. Therefore, the second base coating composition is usually a colored base coating composition that has weak hiding power such that the color tone of the first base coat surface is visible through the second base coating film.

In method (c), as in method (a), a first base coating composition is applied to the substrate and either cured by heating, or not cured, with the coated substrate being left to stand at room temperature for several minutes or being preheated. The second base coating composition is then applied to the first base coat surface to a film thickness of about 10 to about 50 μm (when cured) and is either cured by heating at about 100° C. to about 180° C., preferably at about 120° C. to about 160° C., for about 10 to about 40 minutes, or is not cured, with the coated substrate being left to stand at room temperature for several minutes or being preheated.

Subsequently, the clear coating composition of the invention is applied as a top clear coating composition to a film thickness of about 10 to about 50 μm (when cured) and heated to form a cured multilayer coating film. The heating conditions are as in method (a).

The method of applying a first base coating composition, applying a second base coating composition without heat-curing the first base coating layer, applying a top clear coating composition without curing the second base coating layer, and then curing the resulting three coating layers simultaneously is referred to as a three-coat one-bake method. The method of applying and heat-curing a first base coating composition, applying a second base coating composition, applying a top clear coating composition without curing the second base coating layer and then curing the resulting two coating layers simultaneously is referred to as a three-coat two-bake method. The method of applying and heat-curing a first base coating composition, applying and curing a second base coating composition, and applying and curing a top clear coating composition is referred to as a three-coat three-bake method.

Further, the method for forming a coating film of the present invention relates to a method for forming a multilayer coating film comprising applying as a base coating composition a thermosetting aqueous coating composition to a substrate, applying as a clear coating composition the coating composition of the present invention to the uncured base coat surface, and curing the base coat layer and clear coat layer simultaneously.

When the aqueous two-package type clear coating composition of the present invention is used as a clear coating composition in a multilayer coating film formation method comprising applying a base coating composition, applying a clear coating composition comprising a polyisocyanate compound as a curing agent to the uncured base coating layer, and heat-curing the layers simultaneously, the composition exhibits excellent heat yellowing resistance, particularly when overbaked.

The coating composition of the invention is preferably used as a top clear coating composition in a two-coat one-bake method in method (a), or methods comprising applying a second base coating composition, applying the aqueous two-package type clear coating composition without heat-curing the second base coating layer, and then heat-curing the layers in method (c).

For example, in a method for forming a multilayer coating film comprising applying an aqueous two-package type clear coating composition including a polyisocyanate compound as a curing agent to the uncured base coating film having a L value (whiteness) of 80 or more according to the CIE color matching function and heat curing the resulting two coating layer simultaneously, the Δb indicating the degree of the discoloration (yellow coloration) of the multilayer coating film heat-cured at 140° C. for 20 minutes and overbaked at 160° C. for 50 minutes is as follows, relative to the multilayer coating film heat-cured at 140° C. for 20 minutes. When an ionic compound-modified polyisocyanate compound is used as a curing agent, the Δb often shows 5.0 or more; however, when the aqueous two-package type clear coating composition of the invention is used, the Δb shows 2.0 or less. Thus, in the present invention, the coating film has excellent heat yellowing resistance.

Effects of the Invention

The aqueous two-package type clear coating composition and the process for forming a multilayer topcoat film using the composition of the invention can achieve the following remarkable effects.

(1) Since the coating composition of the present invention comprises a surfactant, which is a specific compound having an anionic functional group, polyoxyethylene group and hydrocarbon group, as a dispersion stability agent of a polyisocyanate compound, the polyisocyanate compound can be suitably dispersed at a high concentration with a small amount of dispersant in an aqueous coating composition, compared to an aqueous coating composition in which a nonionic surfactant is used as a dispersion stability agent of a polyisocyanate compound. Therefore, the curability of the coating composition comprising aqueous dispersion (A) and curing agent (B) is improved, resulting in the composition with excellent coating film performance such as coating film hardness, acid resistance, scratch resistance, etc.

(2) The acrylic resin used as a base resin comprises a certain amount of a second hydroxyl group as a cross-linking functional group, which provides the composition an appropriate curing rate during the curing process. Therefore, the composition of the invention is capable of forming a coating film with excellent antifoaming properties and finish appearance such as surface smoothness.

(3) The aqueous two-package type clear coating composition of the invention is capable of forming a coating film with excellent properties such as hardness, acid resistance, scratch resistance, heat yellowing resistance, antifoaming properties, finish appearance, etc.

(4) According to the multilayer topcoat film formation method of the present invention, a coating film with excellent properties such as hardness, acid resistance, scratch resistance, heat yellowing resistance, antifoaming properties, finish appearance, etc. can be obtained.

BEST MODE FOR CARRYING OUT THE INVENTION

The present invention is described below in more detail with reference to Production Examples, Examples, and Comparative Examples. However, the present invention is not limited to these examples. In the examples, parts and percentages are expressed on a mass basis. Thicknesses of coating films are based on the cured coating films.

Production of Aqueous Acrylic Resin Dispersion (A)

PRODUCTION EXAMPLE 1

Thirty parts of propylene glycol monopropyl ether was placed in a four-necked flask equipped with a heater, a stirrer, a thermometer, a reflux condenser and a water separator, and was heated to 145° C. while supplying nitrogen gas. After stopping the nitrogen gas flow, as a first stage, a mixture of 15 parts of styrene, 1.2 parts of n-butyl acrylate, 30 parts of n-butyl methacrylate, 25 parts of 2-hydroxypropylacrylate, 3.8 parts of 2-hydroxyethyl methacrylate and 2.6 parts of di-t-butylperoxide was added dropwise over a period of 4 hours and then maintained at the above temperature for 30 minutes. As a second stage, a mixture of 15.5 parts of n-butyl acrylate, 5 parts of 2-hydroxypropylacrylate, 1 part of 2-hydroxyethyl methacrylate, 3.5 parts of acrylic acid and 0.9 parts of di-t-butyl peroxide was added dropwise over a period of 30 minutes and then aged for 1 hour. The solvent was distilled off under reduced pressure until the solids content became 95 mass %. After the mixture was cooled to 90° C., 3 parts of dimethylethanolamine was added, and then 105 parts of deionized water was added dropwise at 80° C. to produce aqueous dispersion (A-1) of a hydroxyl group- and acid group-containing acrylic resin.

Aqueous dispersion (A-1) had a solids content of 47%, a viscosity of 570 mPa·s (as measured at 20° C. at 60 rpm using a B-type viscometer), a pH of 7.1, and a mean particle size of 140 nm. The resin in aqueous dispersion (A-1) had a hydroxyl value of 150 mg KOH/g, an acid value of 27 mg KOH/g, a weight average molecular weight of 15,000, and a glass transition temperature (Tg) of 0° C.

The melt viscosity obtained by applying aqueous dispersion (A-1) to a glass plate by using an applicator, drying aqueous dispersion (A-1) at 130° C. for 3 hours to a solids content of 96 mass %, and measuring the viscosity at a shear rate of 564 s$^{-1}$ at 140° C. was 4.0 Pa·s.

The melt viscosity was measured using a cone-and-plate viscosity meter VISCONE CV-1 (trade name, product of Misec Corporation) together with a 100P rotor (cone diameter: 14.5 mm, corn angle: 2°).

PRODUCTION EXAMPLES 2 TO 14

Aqueous dispersions (A-2) to (A-14) of hydroxyl group- and acid group-containing particulate acrylic resins were prepared in a manner similar to Production Example 1 using the proportions shown in Tables 1 and 2.

Tables 1 and 2 also show properties of the hydroxyl group- and acid group-containing acrylic resins and aqueous dispersions.

TABLE 1

| Production Example | | 1 | 2 | 3 | 4 | 5 | 6 | 7 |
|---|---|---|---|---|---|---|---|---|
| Aqueous dispersion | | A-1 | A-2 | A-3 | A-4 | A-5 | A-6 | A-7 |
| Propylene glycol monopropyl ether | | 30 | 30 | 30 | 30 | 30 | 30 | 30 |
| First stage | Styrene | 15 | 15 | 15 | 15 | 15 | 15 | 15 |
| | Methyl methacrylate | | | 10 | | | | |
| | n-Butyl acrylate | 1.2 | 26.2 | | 1.2 | | 9 | 27.2 |
| | n-Butyl methacrylate | 30 | 5 | | 30 | | 22.2 | 4 |
| | i-Butyl methacrylate | | | 15.9 | | 31.2 | | |
| | 2-Hydroxypropylacrylate | 25 | 8.3 | 34 | 25 | 25 | 25 | 25 |
| | 2-Hydroxyethyl methacrylate | 3.8 | 20.5 | | 3.8 | 3.8 | 3.8 | 3.8 |
| | Di-t-butyl peroxide | 2.6 | 2.6 | 2.6 | 7.5 | 2.6 | 2.6 | 2.6 |
| Second stage | n-Butyl acrylate | 15.5 | 15.5 | 14.6 | 15.5 | 15.5 | 15.5 | 15.5 |
| | 2-Hydroxypropylacrylate | 5 | 1.7 | 7 | 5 | 5 | 5 | 5 |
| | 2-Hydroxyethyl methacrylate | 1 | 4.3 | | 1 | 1 | 1 | 1 |
| | Acrylic acid | 3.5 | 3.5 | 3.5 | 3.5 | 3.5 | 3.5 | 3.5 |
| | Di-t-butyl peroxide | 0.9 | 0.9 | 0.9 | 2.5 | 0.9 | 0.9 | 0.9 |
| Dimethylethanolamine | | 3 | 3 | 3 | 3 | 3 | 3 | 3 |
| Acrylic resin properties | | | | | | | | |
| Weight average molecular weight | | 15000 | 15000 | 15000 | 3500 | 15000 | 15000 | 15000 |
| Glass transition temperature (° C.) | | 0 | 0 | 0 | 0 | 10 | −6 | −20 |
| Hydroxyl value (mg KOH/g) | | 150 | 150 | 177 | 150 | 150 | 150 | 150 |
| Acid value (mg KOH/g) | | 27 | 27 | 27 | 27 | 27 | 27 | 27 |
| Resin melting viscosity (Pa · s) | | 4 | 4 | 9 | 0.5 | 7 | 2 | 0.3 |
| Content of monomer (a) in the total content of monomers | | 30 | 10 | 41 | 30 | 30 | 30 | 30 |
| Content of monomer (a) based on the total content of hydroxyl group-containing monomers (%) | | 86 | 29 | 100 | 86 | 86 | 86 | 86 |
| Aqueous Dispersion properties | | | | | | | | |
| Solids content (%) | | 47 | 47 | 47 | 44 | 46 | 47 | 47 |
| B-type viscosity (mPa · s) | | 570 | 880 | 750 | 680 | 980 | 500 | 490 |
| Mean particle size (nm) | | 140 | 125 | 155 | 90 | 122 | 140 | 135 |
| pH | | 7.1 | 7.1 | 7.1 | 6.9 | 7.1 | 7.1 | 7.1 |

TABLE 2

| Production Example | | 8 | 9 | 10 | 11 | 12 | 13 | 14 |
|---|---|---|---|---|---|---|---|---|
| Aqueous dispersion | | A-8 | A-9 | A-10 | A-11 | A-12 | A-13 | A-14 |
| Propylene glycol monopropyl ether | | 30 | 30 | 30 | 30 | 30 | 30 | 30 |
| First stage | Styrene | 15 | 15 | 15 | 13.2 | 15 | 15 | 15 |
| | n-Butyl acrylate | 1.2 | 4.2 | 1.2 | | 1.2 | | 3 |
| | n-Butyl methacrylate | 15 | 9 | | | 30 | 31.2 | 14.9 |
| | 2-Ethylhexylmethacrylate | 15 | | 30 | | | | |
| | isostearylacrylate | | 15 | | 30 | | | |
| | 2-Hydroxypropylacrylate | 25 | | 19 | | 25 | 6.7 | 42 |
| | 2-Hydroxypropylmethacrylate | | 28 | 6 | 28 | | | |
| | 2-Hydroxyethyl methacrylate | 3.8 | 3.8 | 3.8 | 3.8 | 3.8 | 22.1 | |
| | Di-t-butyl peroxide | 2.6 | 2.6 | 2.6 | 2.6 | 0.9 | 2.6 | 2.6 |
| Second stage | n-Butyl acrylate | | | | | 15.5 | 13.5 | 13.6 |
| | n-Butyl methacrylate | 15.5 | 15.5 | 15.5 | 15.5 | | 2 | |
| | 2-Hydroxypropylacrylate | 5 | 5 | 5 | 5 | 5 | 1.3 | 8 |
| | 2-Hydroxyethyl methacrylate | 1 | 1 | 1 | 1 | 1 | 4.7 | |
| | Acrylic acid | 3.5 | 3.5 | 3.5 | 3.5 | 3.5 | 3.5 | 3.5 |
| | Di-t-butyl peroxide | 0.9 | 0.9 | 0.9 | 0.9 | 0.3 | 0.9 | 0.9 |
| Dimethylethanolamine | | 3 | 3 | 3 | 3 | 3 | 3 | 3 |
| Acrylic resin properties | | | | | | | | |
| Weight average molecular weight | | 15000 | 15000 | 15000 | 15000 | 40000 | 15000 | 15000 |
| Glass transition temperature (° C.) | | 0 | 0 | 0 | 0 | 0 | 0 | −20 |
| Hydroxyl value (mg KOH/g) | | 150 | 150 | 150 | 150 | 150 | 150 | 215 |
| Acid value (mg KOH/g) | | 27 | 27 | 27 | 27 | 27 | 27 | 27 |
| Resin melting viscosity (Pa · s) | | 3.5 | 3.2 | 3.2 | 2.9 | 15 | 5 | 12 |
| Content of monomer (a) in the total content of monomers | | 30 | 33 | 30 | 33 | 30 | 8 | 50 |
| Content of monomer (a) based on the total content of hydroxyl group-containing monomers (%) | | 86 | 87 | 86 | 87 | 86 | 23 | 100 |
| Aqueous Dispersion properties | | | | | | | | |
| Solids content (%) | | 49 | 50 | 46 | 45 | 45 | 47 | 46 |
| B-type viscosity (mPa · s) | | 380 | 360 | 480 | 380 | 820 | 480 | 620 |
| Mean particle size (nm) | | 127 | 142 | 175 | 192 | 125 | 144 | 132 |
| pH | | 6.8 | 6.7 | 7.3 | 7.4 | 7.0 | 7.0 | 7.1 |

Production of Aqueous Two-package Type Clear Coating Composition

EXAMPLES 1 TO 16 AND COMPARATIVE EXAMPLES 1 TO 6

Aqueous two-package type clear coating compositions 1 to 22 were obtained by mixing with stirring aqueous dispersions of acrylic resins (A-1) to (A-14) obtained in Production Examples 1 to 14, polyisocyanate curing agents (B-1) to (B-4), antioxidant, etc., in the proportions shown in Tables 3 to 5 using a disperser.

COMPARATIVE EXAMPLE 7

By adding 34.3 parts of Tolonate HDT (NCO titration: 0.521, produced by Rhodia Inc., polyisocyanate compound), 5.0 g of butyl acetate, and one part of light stabilizer A to the dispersion obtained by stirring 63 parts (solids content) of aqueous dispersion (A), 2.7 parts of Rhodafac RE 610 (produced by Rhodia Inc., surfactant), and 0.62 g of triethylamine at 100 rpm using a disperser for 5 minutes, the mixture was mixed while stirring with a disperser to form a coating composition. Aqueous two-package type clear coating composition 23 is thus obtained.

TABLE 3

| | | Example | | | | | | | |
|---|---|---|---|---|---|---|---|---|---|
| | | 1 | 2 | 3 | 4 | 5 | 6 | 7 | 8 |
| Aqueous two-package type clear coating composition No. | | 1 | 2 | 3 | 4 | 5 | 6 | 7 | 8 |
| Acrylic Resin | Aqueous Dispersion (A-1) | 63 | 67 | 63 | 63 | 60 | | | |
| | Aqueous Dispersion (A-2) | | | | | | 63 | | |
| | Aqueous Dispersion (A-3) | | | | | | | 58.5 | |
| | Aqueous Dispersion (A-4) | | | | | | | | 63 |
| Curing Agent | (B-1) | 31 | 25 | 37 | 28 | 35 | 37 | 41.5 | 37 |
| | (B-3) | | | | 9 | | | | |
| | (B-4) | | 8 | | | | | | |

TABLE 3-continued

|  | Example | | | | | | | |
|---|---|---|---|---|---|---|---|---|
|  | 1 | 2 | 3 | 4 | 5 | 6 | 7 | 8 |
| Mf-A |  |  |  |  | 5 |  |  |  |
| Antioxidant A |  | 1 |  |  |  |  |  |  |
| Light Stabilizer A | 1 | 1 | 1 | 1 | 1 | 1 | 1 | 1 |
| Light Stabilizer B |  |  |  |  |  |  |  |  |
| Mean particle size (nm) |  |  | 140 |  |  | 125 | 155 | 90 |
| Solids content (%) | 49 | 49 | 49 | 49 | 50 | 50 | 50 | 50 |
| VOC amount (g/l) | 90 | 90 | 90 | 90 | 90 | 90 | 90 | 90 |
| Solids content (%) of applied coating composition | 92 | 92 | 92 | 92 | 92 | 92 | 92 | 91 |
| Lowest viscosity value (Pa · s) | 8 | 7 | 8 | 8 | 7 | 10 | 13 | 2 |

TABLE 4

|  |  | Example | | | | | | | |
|---|---|---|---|---|---|---|---|---|---|
|  |  | 9 | 10 | 11 | 12 | 13 | 14 | 15 | 16 |
| Aqueous two-package type clear coating composition No. |  | 9 | 10 | 11 | 12 | 13 | 14 | 15 | 16 |
| Acrylic Resin | Aqueous Dispersion (A-1) |  |  |  |  |  |  |  | 63 |
|  | Aqueous Dispersion (A-5) | 63 |  |  |  |  |  |  |  |
|  | Aqueous Dispersion (A-6) |  | 63 |  |  |  |  |  |  |
|  | Aqueous Dispersion (A-7) |  |  | 63 |  |  |  |  |  |
|  | Aqueous Dispersion (A-8) |  |  |  | 63 |  |  |  |  |
|  | Aqueous Dispersion (A-9) |  |  |  |  | 63 |  |  |  |
|  | Aqueous Dispersion (A-10) |  |  |  |  |  | 63 |  |  |
|  | Aqueous Dispersion (A-11) |  |  |  |  |  |  | 63 |  |
| Curing Agent (B-1) |  | 37 | 37 | 37 | 37 | 37 | 37 | 37 | 37 |
| Light Stabilizer A |  | 1 | 1 | 1 | 1 | 1 | 1 | 1 | 1 |
| Weight average molecular weight |  | 15000 | 15000 | 15000 | 15000 | 15000 | 15000 | 15000 | 15000 |
| Mean particle size (nm) |  | 122 | 140 | 135 | 120 | 118 | 172 | 183 | 140 |
| Solids content (mass %) |  | 49 | 49 | 49 | 53 | 54 | 48 | 47 | 49 |
| VOC amount (g/l) |  | 90 | 90 | 90 | 90 | 90 | 90 | 90 | 90 |
| Solids content (%) of applied coating composition |  | 92 | 91 | 91 | 91 | 91 | 91 | 91 | 92 |
| Lowest viscosity value (Pa · s) |  | 12 | 6 | 3 | 6 | 6 | 5 | 5 | 8 |

TABLE 5

|  |  | Comparative Example | | | | | | |
|---|---|---|---|---|---|---|---|---|
|  |  | 1 | 2 | 3 | 4 | 5 | 6 | 7 |
| Aqueous two-package type clear coating composition No. |  | 17 | 18 | 19 | 20 | 21 | 22 | 23 |
| Acrylic Resin | Aqueous Dispersion (A-1) | 65 | 60 |  |  |  | 63 | 63 |
|  | Aqueous Dispersion (A-12) |  |  | 63 |  |  |  |  |
|  | Aqueous Dispersion (A-13) |  |  |  | 63 |  |  |  |
|  | Aqueous Dispersion (A-14) |  |  |  |  | 53.5 |  |  |
| Curing Agent | (B-1) |  |  | 37 | 37 | 46.5 | 37 |  |
|  | (B-2) | 35 |  |  |  |  |  |  |
|  | (B-3) |  | 40 |  |  |  |  |  |
|  | Tolonate HDT |  |  |  |  |  |  | 34.3 |
|  | Rhodafac RE 610 |  |  |  |  |  |  | 2.7 |
| Triethylamine |  |  |  |  |  |  |  | 0.62 |
| Butyl acetate |  |  |  |  |  |  |  | 5.0 |
| Light Stabilizer A | | 1 | 1 | 1 | 1 | 1 |  | 1 |
| Light Stabilizer B | |  |  |  |  |  | 1 |  |
| Mean particle size (nm) | | 140 | 140 | 125 | 144 | 132 | 140 | 320 |
| Solids content (mass %) | | 49 | 49 | 50 | 49 | 50 | 49 | 49 |
| VOC amount (g/l) | | 90 | 90 | 90 | 90 | 90 | 90 | 90 |

TABLE 5-continued

|  | Comparative Example | | | | | | |
| --- | --- | --- | --- | --- | --- | --- | --- |
|  | 1 | 2 | 3 | 4 | 5 | 6 | 7 |
| Solids content (%) of applied coating composition | 92 | 92 | 91 | 92 | 92 | 92 | 92 |
| Lowest viscosity value (Pa · s) | 10 | 11 | 32 | 10 | 34 | 8 | 8 |

In Tables 3 to 5, the proportions of the components in the coating compositions are expressed as mass ratios of the components on a solids basis. In aqueous two-package type clear coating compositions 1 to 23, the ratio of functional groups of (NCO/OH) is 1/1.

Curing agents (B-1) to (B-4) in Tables 3 to 5 are polyisocyanate curing agents produced in the following Production Examples or commercially available products.

PRODUCTION EXAMPLE OF CURING AGENT (B-1)

165 g of Tolonate HDT (NCO titration: 0.521, polyisocyanate compound, produced by Rhodia Inc.) was mixed with 24 g of butyl acetate, 13 g of Rhodafac RE 610 (Rhodia Inc., surfactant), and 3 g of triethylamine. The mixture was stirred at 100 rpm for 5 minutes using a disperser to thereby obtain a polyisocyanate curing agent.

PRODUCTION EXAMPLE OF CURING AGENT (B-2)

970 g (5.00 mol) of polyisocyanate comprising an isocyanurate group and having a NCO content of 21.7% based on hexamethylene diisocyanate, an average NCO functional value of 3.5 (according to GPC), a monomer (HDI) content of 0.1%, a viscosity of 3000 mPa·s (23° C.), 30 g (0.14 mol) of 3-(cyclohexylamino)propanesulfonic acid, 17.4 g (0.14 mol) of dimethylcyclohexylamine, and 254 g of 1-methoxy propyl-2-acetate were stirred at 80° C. for 5 hours under dry nitrogen to obtain a sulfonic acid-modified polyisocyanate compound (solids content: 80%, NCO content: 16.0%).
Curing Agent (B-3)
Takenate WD-220 (produced by Mitsui Chemicals Polyurethanes Inc., nonionic-modified polyisocyanate, NCO content: 17.4%)
Curing Agent (B-4)
XP-2410 (produced by Sumika Bayer Urethane Co., Ltd., a low-viscosity polyisocyanate compound, NCO content: 24.0%)

Mf-A, antioxidant A, light stabilizer A, and light stabilizer B in Tables 3 to 5 are as follows.
Mf-A: Cy327 (produced by Mitsui Cytec Ltd., an imino group-containing methylated melamine resin)
Antioxidant A: Irganox 245DW (produced by Ciba Specialty Chemicals, aqueous dispersion of hindered phenolic antioxidant)
Light stabilizer A: TINUVIN 152 (produced by Ciba Specialty Chemicals, 2,4-bis[N-butyl-N-(cyclohexyloxy-2,2,6,6-tetramethylpiperidine-4-yl)amino]-6-(2-hydroxyethylamine)-1,3,5-triazine (an active hydrogen-containing light stabilizer)
Light stabilizer B: TINUVIN 292 (produced by Ciba Specialty Chemicals, mixture of bis(1,2,2,6,6-pentamethyl-4-piperidyl)sebacate and methyl(1,2,2,6,6-pentamethyl-4-piperidyl)sebacate (a light stabilizer containing no active hydrogen)

A mixture containing 20% of ethylene glycol monobutyl ether and 80% of water was added to each of aqueous two-package type clear coating compositions 1 to 23 obtained in Examples 1 to 16 and Comparative Examples 1 to 7 to adjust the viscosity to 45 seconds using a Ford cup No. 4.

The mean particle size, the solids content (%), the amount of VOC (g/l) and the lowest viscosity value of each of the viscosity-adjusted coating compositions were determined.
Mean Particle Size The mean particle size is a value obtained by measurement at 20° C. using a submicron particle size distribution analyzer after the particulate resin is diluted with deionized water according to the usual method. Examples of submicron particle size distribution analyzers include the "COULTER N4" (trade name, produced by Beckman Coulter, Inc.).
Solids Content About 2 g of the viscosity-adjusted aqueous two-package type clear coating composition was placed into an aluminum foil cup with a diameter of about 5 cm, and dried at 110° C. for 1 hour. The weight was then measured to calculate the solids content (%) of the composition.
VOC Amount The VOC amount of the viscosity-adjusted aqueous two-package type clear coating composition was calculated from the solids content, specific gravity and moisture content of the composition according to equation (1) shown below. The specific gravity was measured by the specific gravity cup method according to JIS K-5400 4.6.2. The moisture content was measured by the Karl Fischer method using an automatic moisture meter (trade name, "KF-100", produced by Mitsui Chemical, Inc.).

$$\text{VOC amount (g/l)} = ([100-(S+W)] \times \rho)/[100-(W \times \rho)] \quad (1)$$

In equation (1), S represents the solids content (%) of the coating composition, W the moisture content (%) of the coating composition, and ρ the specific gravity (g/l) of the coating composition.
Lowest Viscosity Value The viscosity-adjusted aqueous two-package type clear coating composition was applied by air spraying to a tin plate (300×450×0.3 mm) having been degreased with isopropanol, to a film thickness of 35 μm (when dried) and heated at 60° C. for about 10 minutes. The uncured coating film formed on the tin plate was scraped off, collected into a sample bottle and sealed therein as a sample by closing the cap. Using a Rheostress RS-150 viscoelasticity meter (trade name, produced by HAAKE), the dynamic viscoelasticity of 1.0 g of this sample was measured under strain control at a frequency of 0.1 Hz, a strain of 1.0, sensor based on a parallel plate (φ=20 mm), a gap of 0.5 mm, and a temperature increase rate of 6° C./min. The lowest viscosity value over the temperature range of 30° C. to 150° C. was determined.
Solids Content (%) of the Coating Composition after Applied and Heated at 60° C. for about 10 Minutes About 2.0 g of the sample was placed in an aluminum foil cup with a diameter of about 5 cm and heated at 110° C. for 1 hour to measure the amount of residue (g). The amount of residue after the heating for 1 hour was referred to as the solids content (%) of the coating composition after applied and heated at 60° C. for about 10 minutes.

The measurement results are shown in Tables 3 to 5.

Performance Test of the Coating Film

Preparation of Test Plates

By adding a mixture containing 20% of ethylene glycol monobutyl ether and 80% of water, aqueous two-package type clear coating compositions 1 to 23 obtained in Examples 1 to 16 and Comparative Examples 1 to 7 were adjusted to a viscosity of 45 seconds as measured using a Ford cup No. 4.

Elecron GT-10 (produced by Kansai Paint Co., Ltd., a thermosetting epoxy resin cationic electrodeposition coating composition) was applied by electrodeposition to a cold rolled steel plate (400×300×0.8 mm) treated using Palbond #3020 (produced by Nihon Parkerizing Co., Ltd., zinc phosphate treatment) to a film thickness of 20 µm and heat-cured at 170° C. for 30 minutes.

Subsequently, Amilac TP-65-2 (produced by Kansai Paint Co., Ltd., a polyester/melamine resin intermediate coating composition for automobiles) was applied to the coating film by air spraying to a film thickness of 35 µm and heat-cured at 140° C. for 30 minutes.

Aqueous metallic base coat WBC 710T #1E7 (produced by Kansai Paint Co., Ltd., an acryl/melamine resin base coating composition for automobile topcoats) was applied to the coating film to a film thickness of 15 µm, allowed to stand at room temperature for 5 minutes and pre-heated at 80° C. for 10 minutes. Each of the viscosity-adjusted aqueous two-package type clear coating compositions 1 to 23 produced in the Examples and Comparative Examples was applied on the uncured base coating layer to a film thickness of about 35 µm (when cured). The coated substrate was allowed to stand at room temperature for 10 minutes, preheated at 60° C. for 10 minutes and then heated at 140° C. for 20 minutes to cure the resulting two coating layers simultaneously. Thus, test plates comprising a substrate and a multilayer topcoat film consisting of a base coat and a clear coat formed on the substrate were prepared by a two-coat one-bake method.

Performance Tests

The obtained test plates were tested in the following manner.

Finish Appearance

The test plate was observed by the naked eye to evaluate the surface smoothness and gloss according to the following criteria:

A: Good in both smoothness and gloss

B: Poor in either smoothness or gloss

C: Poor in both smoothness and gloss

Tukon Hardness

After the test plate was left in a thermostatic room at 20° C. for 24 hours, the Tukon hardness was measured using a TUKON (produced by American Chain & Cable Company, a Tukon Microhardness Tester).

The Tukon hardness, also called the "Knoop Hardness Number (KHN)", is a value expressing the hardness of a coating film determined by pressing a square pyramidal diamond indenter with a specific load in the surface of a test material and measuring the size of the diamond-shaped indentation in the surface. The greater the Tukon hardness value, the greater the hardness.

Water Resistance

The test plate was left in a thermostatic room at 20° C. for 24 hours, immersed in warm water of 80° C. for 5 hours and then gradually cooled from 80° C. to room temperature while kept immersed. The test plate was removed from the water, and the surface state of the test plate was evaluated according to the following criteria:

A: Good gloss

B: Poor gloss

C: Poor gloss and white cloudy coated surface

Acid Resistance 0.4 ml of 40% sulfuric acid was added dropwise to the test plate. The test plate was then heated for 15 minutes on a hot plate heated to 85° C., and washed with water. The coated surface was observed, and evaluated according to the following criteria.

A: No change; exhibiting high resistance to acid

B: A slight difference in film thickness between the solution-applied portion and the solution-unapplied portion; exhibiting high resistance to acid C: A relevant difference in film thickness between the solution-applied portion and the solution-unapplied portion; exhibiting slightly poor resistance to acid D: Blushing on the coated surface; exhibiting poor resistance to acid.

Moisture Resistance

The test plate was allowed to stand in an atmosphere of 90% R.H at 50° C. for one week. The coated surface was observed for blistering.

A: No blistering; exhibiting high moisture resistance.

B: Blistering on the coating film

Foaming Resistance

Elecron GT-10 (produced by Kansai Paint Co., Ltd., a thermosetting epoxy resin cationic electrodeposition coating composition) was applied by electrodeposition to a cold rolled steel plate (400×300×0.8 mm) treated using Palbond #3020 (produced by Nihon Parkerizing Co., Ltd., zinc phosphate treatment) to a film thickness of 20 µm and heat-cured at 170° C. for 30 minutes. Subsequently, Amilac TP-65-2 (produced by Kansai Paint Co., Ltd., a polyester/melamine resin intermediate coating composition for automobiles) was applied to the electrodeposition coating surface by air spraying to a film thickness of 35 µm and heat-cured at 140° C. for 30 minutes. Aqueous Metallic Base Coat WBC 710T#1E7 (produced by Kansai Paint Co., Ltd., an acryl/melamine resin base coating composition for automobile topcoats) was applied to the substrate to a film thickness of 15 µm, allowed to stand at room temperature for 5 minutes and pre-heated at 80° C. for 10 minutes. Each of the viscosity-adjusted aqueous two-package type clear coating compositions 1 to 23 produced in the Examples and Comparative Examples was applied on the uncured base coating layer to a film thickness of 35 µm. The coated substrate was allowed to stand at room temperature for one minute, preheated at 60° C. for 10 minutes and then heated at 140° C. for 20 minutes to cure the resulting two coating layers simultaneously. The foaming resistance was evaluated according to the following criteria.

A: Traces of foaming on the coated surface

B: No trace of foaming on the coated surface

Sagging Resistance

A dull steel plate (150×450×0.8 mm (thickness) used in landscape orientation was prepared, having a row of 5 mm-diameter holes set at 2 cm intervals provided from a portion 3 cm from an edge of a 450 mm side. Each of the viscosity-adjusted aqueous two-package type clear coating compositions 1 to 23 produced in the Examples and Comparative Examples was applied to the dull steel plate to form a coating film with gradient thicknesses of from 25 μm to 70 μm. After applying the composition, with the coated plate mounted on the plate stand, the plate was allowed to stand at room temperature for one minute, pre-heated at 60° C. for 10 minutes, and then heated at 140° C. for 20 minutes to thereby prepare the test plate.

The trace of sagging on the coating film from the bottom portion of the holes was observed with the naked eye, and the film thickness (am) of a position at least 5 mm from the bottom portion of the hole was evaluated.

Yellowing Due to Overbaking

Elecron GT-10 (produced by Kansai Paint Co., Ltd., a thermosetting epoxy resin cationic electrodeposition coating composition) was applied by electrodeposition to a cold rolled steel plate (400×300×0.8 mm) treated using Palbond #3020 (produced by Nihon Parkerizing Co., Ltd., zinc phosphate treatment) to a film thickness of 20 μm and heat-cured at 170° C. for 30 minutes. Subsequently, an aqueous intermediate coating composition (the first base for WP 305T #070, produced by Kansai Paint Co., Ltd., a polyester/melamine resin intermediate coating composition for automobiles, L value (whiteness) being 95 based on the CIE color matching function) was applied to the surface by air spraying to a film thickness of 35 μm, allowed to stand at room temperature for 5 minutes, pre-heated at 80° C. for 10 minutes, and heat-cured at 150° C. for 30 minutes. An aqueous mica base coat (the second base for WBC 713T #070, produced by Kansai Paint Co., Ltd., an acrylic/melamine resin base coating composition for automobile topcoats) was applied to the coating film to a film thickness of 15 μm, allowed to stand at room temperature for 5 minutes and pre-heated at 80° C. for 10 minutes. Each of the viscosity-adjusted aqueous two-package type clear coating compositions 1 to 23 produced in the Examples and Comparative Examples was applied on the uncured base coating layer to a film thickness of 40 μm. The coated substrate was allowed to stand at room temperature for 10 minutes, preheated at 60° C. for 10 minutes and then heated at 140° C. for 20 minutes to cure the coating layers. The resulting test plate was separated into two plates. The partially-separated plate was referred to as a base plate, and the other plate (the test plate) was further heated at 160° C. for 50 minutes.

The yellowing due to overbaking was evaluated by calculating the Δb value of the plate heated 160° C. for 50 minutes relative to the base plate according to the CIE color matching function. The greater the Δb value, the greater the degree of yellowing (discoloration). The measurement was conducted using a color guide 45/0 from BYK Gardner K.K.

Tables 6 to 8 show the results of the performance tests.

TABLE 6

|  | Example | | | | | | | |
| --- | --- | --- | --- | --- | --- | --- | --- | --- |
|  | 1 | 2 | 3 | 4 | 5 | 6 | 7 | 8 |
| Aqueous two-package type clear coating composition No. | 1 | 2 | 3 | 4 | 5 | 6 | 7 | 8 |
| Finish appearance | A | A | A | A | A | A | A | A |
| Tukon hardness | 9 | 10 | 9 | 7 | 10 | 11 | 8 | 7 |
| Water resistance | A | A | A | A | A | A | A | A |
| Acid resistance | B | B | B | B | B | B | B | B |
| Moisture resistance | A | A | A | A | A | A | A | A |
| Foaming resistance | A | A | A | A | A | A | A | A |
| Sagging resistance (film thickness; μm) | 50 | 50 | 49 | 50 | 51 | 49 | 52 | 45 |
| Yellowing due to overbaking | 0.9 | 0.8 | 0.5 | 0.9 | 0.7 | 0.8 | 0.9 | 0.8 |

TABLE 7

|  | Example | | | | | | | |
| --- | --- | --- | --- | --- | --- | --- | --- | --- |
|  | 9 | 10 | 11 | 12 | 13 | 14 | 15 | 16 |
| Aqueous two-package type clear coating composition No. | 9 | 10 | 11 | 12 | 13 | 14 | 15 | 16 |
| Finish appearance | A | A | A | A | A | A | A | A |
| Tukon hardness | 11 | 8 | 7 | 9 | 8 | 7 | 6 | 9 |
| Water resistance | A | A | A | A | A | A | A | A |
| Acid resistance | B | B | B | A | A | A | A | B |
| Moisture resistance | A | A | A | A | A | A | A | A |
| Foaming resistance | A | A | A | A | A | A | A | A |
| Sagging resistance (film thickness; μm) | 51 | 49 | 48 | 57 | 58 | 47 | 45 | 50 |
| Yellowing due to overbaking | 0.9 | 0.9 | 0.8 | 0.9 | 0.8 | 0.9 | 0.8 | 0.9 |

TABLE 8

| | Comparative Example | | | | | | |
|---|---|---|---|---|---|---|---|
| | 1 | 2 | 3 | 4 | 5 | 6 | 7 |
| Aqueous two-package type clear coating composition No. | 17 | 18 | 19 | 20 | 21 | 22 | 23 |
| Finish appearance | A | A | A | A | A | A | B |
| Tukon hardness | 10 | 3 | 10 | 11 | 10 | 9 | 5 |
| Water resistance | A | C | A | A | A | A | A |
| Acid resistance | B | B | B | B | B | B | C |
| Moisture resistance | A | A | A | A | A | B | A |
| Foaming resistance | A | A | B | B | B | A | A |
| Sagging resistance (film thickness; μm) | 51 | 47 | 52 | 52 | 49 | 50 | 50 |
| Yellowing due to overbaking | 8.5 | 1.1 | 0.7 | 0.8 | 0.8 | 0.9 | 0.9 |

The invention claimed is:

1. An aqueous two-package type clear coating composition comprising:
   (A) an aqueous dispersion of a hydroxyl group- and acid group-containing acrylic resin having a hydroxyl value of 30 to 200 mg KOH/g, an acid value of 5 to 50 mg KOH/g, a weight average molecular weight of 5,000 to 20,000, and a glass transition temperature of −30 to +40° C. obtained by radical polymerization of 10 to 50 mass % of a secondary hydroxyl group-containing monomer (a) and 50 to 90 mass % of other unsaturated monomer (b),
   wherein the acrylic resin is obtained by solution polymerization, and the solution polymerization reaction is performed by a two stage polymerization method; and
   (B) a polyisocyanate curing agent obtained by mixing (c) a polyisocyanate compound and (d) a compound containing an anionic functional group, a polyoxyethylene group, and a hydrocarbon group.

2. The coating composition according to claim 1, wherein the curing agent (B) is obtained by mixing the compound (c) and the compound (d), the compound (d) being 0.5 to 25 parts by mass per 100 parts by mass of the compound (c).

3. The coating composition according to claim 1, wherein the monomer (a) is at least one member selected from the group consisting of 2-hydroxypropyl (meth)acrylate, 2-hydroxybutyl (meth)acrylate, 3-hydroxybutyl (meth)acrylate, and adducts of (meth)acrylic acids and epoxy group-containing compounds.

4. The coating composition according to claim 3, wherein the monomer (a) is 2-hydroxypropyl (meth)acrylate.

5. The coating composition according to claim 1, wherein the aqueous dispersion (A) comprises an acrylic resin obtained from monomer (a) and monomer (b),
   wherein the monomer (b) comprises 5 to 30 mass % of at least one (meth)acrylate having a branched $C_{8-18}$ alkyl group.

6. The coating composition according to claim 1, which further comprises a hindered phenolic-based antioxidant (C).

7. The coating composition according to claim 1, which further comprises an ultraviolet absorber (D).

8. The coating composition according to claim 1, which further comprises an active hydrogen-containing light stabilizer (E).

9. The coating composition according to claim 1, wherein the lowest viscosity as measured at a temperature of 30 to 150° C. at a frequency of 0.1 Hz is 30 Pa·s or less.

10. The coating composition according to claim 1, wherein the melt viscosity of the aqueous dispersion (A) as measured at a solids content of at least 96 mass % at a shear rate of 564 $s^{-1}$ at 140° C. is 1 to 12 Pa·s.

11. The coating composition according to claim 1, wherein the equivalent ratio (NCO/OH) of isocyanate groups of the curing agent (B) to hydroxyl groups of the acrylic resin in the aqueous dispersion (A) is 0.5 to 2.0.

12. The coating composition according to claim 1, wherein the solids content is 35 to 65 mass %.

13. A process for forming a multilayer topcoat film comprising forming on a substrate at least one base coat layer and at least one clear coat layer in that order,
   wherein the aqueous two-package type clear coating composition according to claim 1 is applied as the uppermost top clear coat composition.

14. A process for forming a multilayer topcoat film, comprising applying as a base coating composition a thermosetting aqueous coating composition to a substrate, applying the aqueous two-package type clear coating composition according to claim 1 as a clear coating composition to the uncured base coat surface, and then curing the resulting two coating layers simultaneously.

* * * * *